Figure 1:
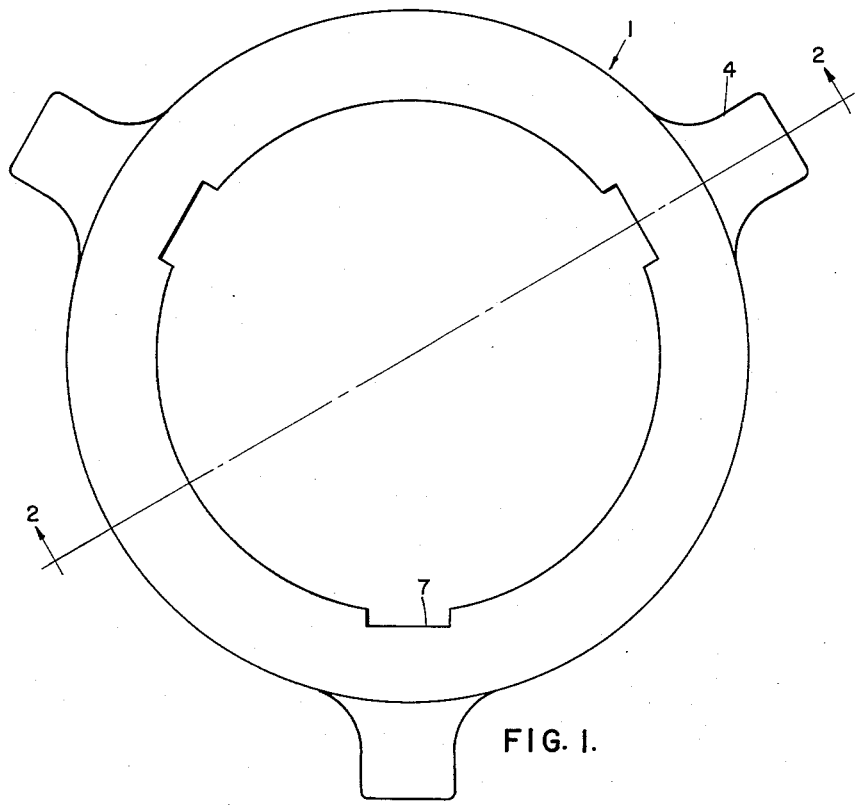

Feb. 14, 1961     O. SPARKMAN ET AL     2,971,782
CRYOGENIC PIPE COUPLING

Filed Dec. 30, 1958     4 Sheets-Sheet 1

Orval Sparkman
and
C. T. Wasileski
INVENTORS,

BY

ATTORNEYS

Orval Sparkman
and
C. T. Wasileski
INVENTORS,

BY
ATTORNEYS

Orval Sparkman
C. T. Wasileski
INVENTORS

United States Patent Office 2,971,782
Patented Feb. 14, 1961

2,971,782
CRYOGENIC PIPE COUPLING

Orval Sparkman, 1036 Bayfield Drive, and Chester T. Wasileski, 4018 Heatherhill Road, both of Huntsville, Ala.

Filed Dec. 30, 1958, Ser. No. 784,007

1 Claim. (Cl. 285—332.3)

(Granted under Title 35, U.S. Code (1952), sec. 266)

The invention described herein may be manufactured and used by or for the Government for governmental purposes without the payment of any royalty thereon.

This invention relates to coupling means and in particular to couplings used for connecting liquified gas lines which may be quickly connected or disconnected and which are self-seating, self-sealing and non-leaking.

More particularly the present invention relates to an improved device for coupling together the ends of fluid conduits such as tubes, pipes, hoses and the like, and especially conduits carrying liquified gases such as liquid oxygen producing extremely low temperatures.

An object of the invention is to provide an improved lightweight, self-sealing, self-seating coupling for liquified gas lines which is adapted to receive the ends of the fluid conduits which are to be coupled together.

Another object is to provide such a coupling which can be quickly and readily connected or disconnected for quick and easy operation, particularly at extremely low temperatures.

A further object of this invention is to provide a coupling having adjacent parts made of the same metal and having no metal to metal contact between such adjacent parts thereby providing a cryogenic coupling suitable for use at extremely low temperatures and under extreme weather conditions.

Other objects and advantages will occur to those skilled in the art after a study of the following description in connection with the accompanying drawings, and from the appended claim.

Figure 2:
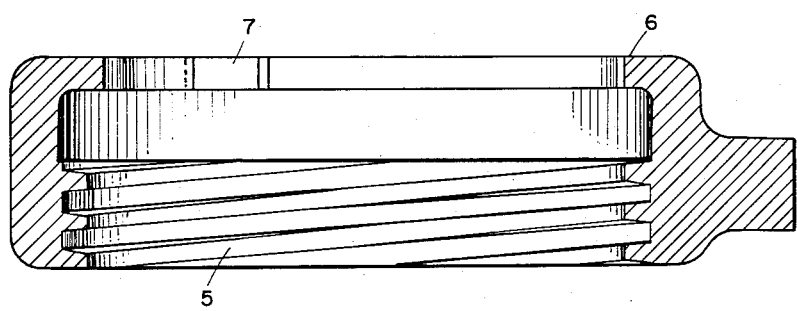
Figure 3:
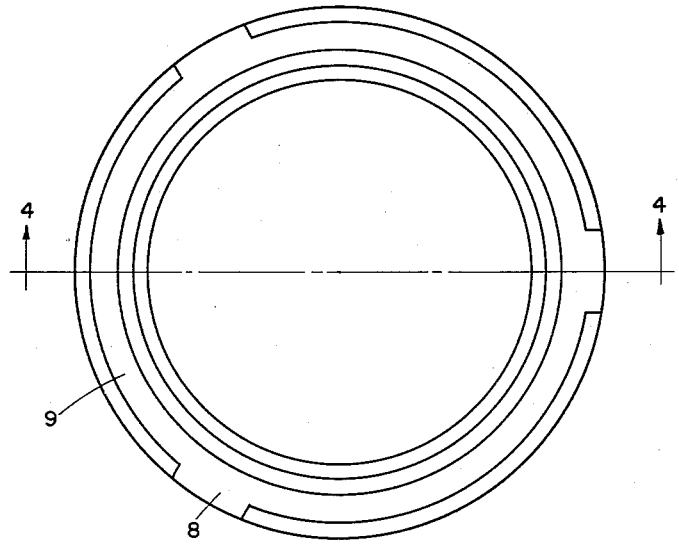
Figure 4:
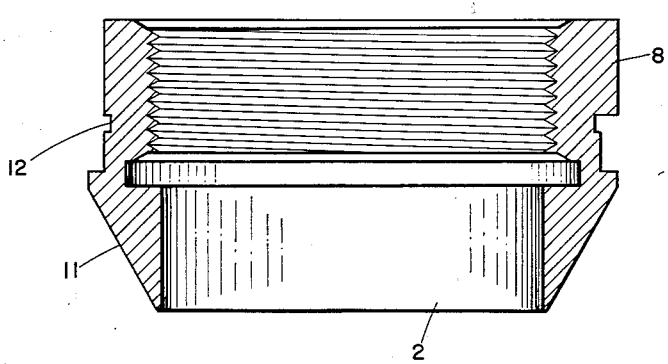
Figure 5:
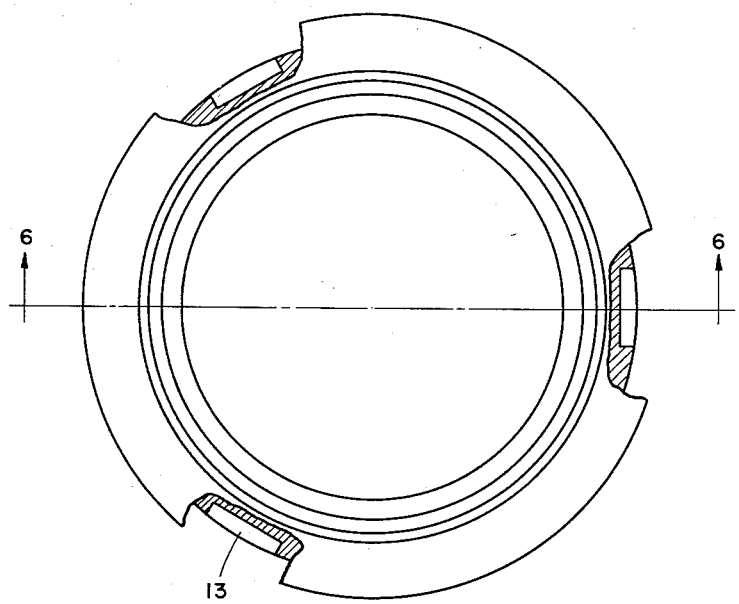
Figure 6:
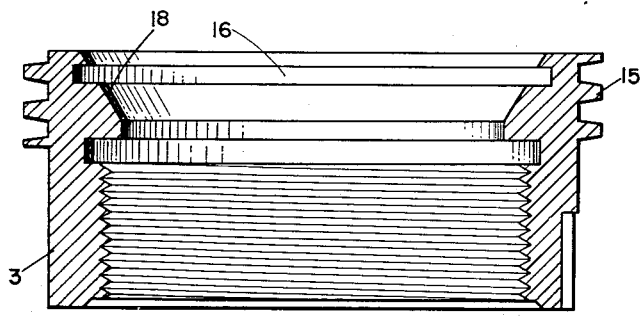
Figure 9:
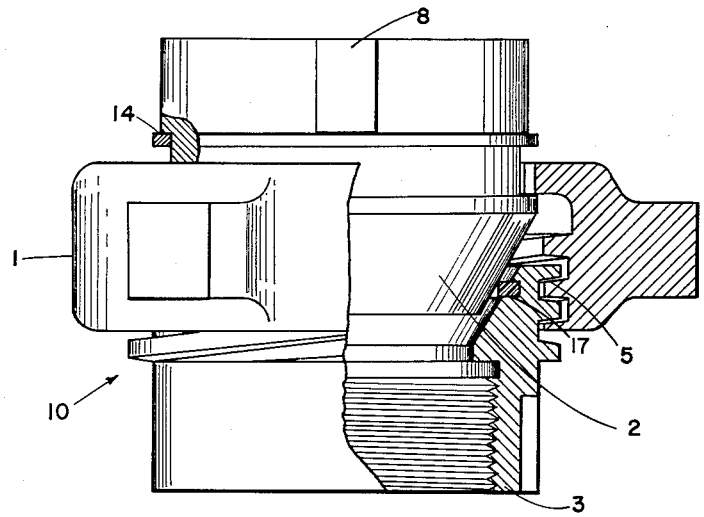
Figure 7:
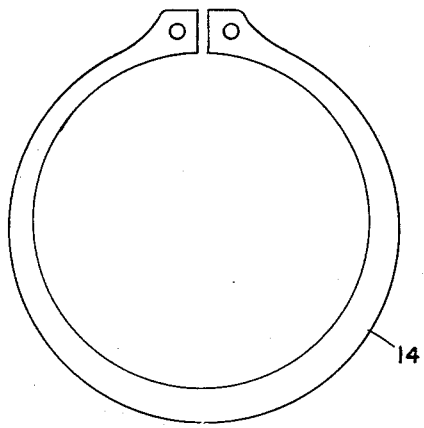
Figure 8:
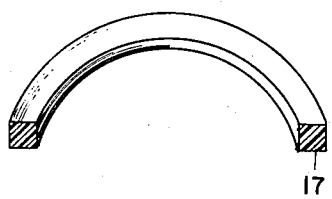

In the drawings:

Figure 1 is a plan view of a preferred embodiment of the union locking nut,

Figure 2 is a sectional view taken in a plane identified by line 2—2 of Figure 1, Figure 3 is a plan view of a preferred embodiment of the male conical body member of the coupling, Figure 4 is a sectional view taken in a plane identified by line 4—4 of Figure 3, Figure 5 is a plan view of a preferred embodiment of the female seating body member of the coupling, Figure 6 is a sectional view taken in a plane identified by line 6—6 of Figure 5, Figure 7 is a plan view of the retaining ring, Figure 8 is an elevation partly in section of the low temperature resistant seal shown in Figure 9, Figure 9 is an assembly of the preferred embodiment of the invention partly in cross section.

In the art of rockets and guided missiles one of the major limitations in using presently available coupling devices for connecting liquified gas lines has been their excessive weight. Time is the deciding factor in servicing and firing missiles under field conditions and under actual combat conditions and therefore larger liquified gas lines are used than under normal conditions not involving missile applications, and the attendant problem of providing couplings of comparable sizes to fit these lines is not solved by presently available couplings as such increases in size necessarily involve a corresponding substantial increase in weight. Consequently in servicing missiles and rockets the operator is frequently required to carry the lines manually over rough terrain and usually some distance up the side of the missile under all extremities of weather so that light weight couplings become an absolute necessity.

Another complicating limitation encountered in the field of liquified gas lines results from the extremely low temperatures of the liquified gases transmitted through these lines. The pressure exerted on the couplings by the liquified gases while flowing through the lines, and the extreme coldness of the gases in the case of the hitherto available couplings caused cracking, bursting and freezing of the parts thus interrupting and delaying missile servicing operations. Thus the development of couplings such as those provided by this invention constitutes an advance in the art by overcoming these difficulties in utilizing modern light weight metals and by providing a novel seating arrangement of the coupling parts which avoids metal-to-metal bonding. The gas industry has for some time been confronted with the problem of leakage inherent in handling liquified gases. For example liquid oxygen, boiling at −297° F., causes uneven cooling of coupling parts in couplings now in use employing metal to metal contact of adjacent parts. A similar problem occurs in using such couplings with other liquified gases. In accordance with the present invention these problems of leakage and of freezing and other disruption of the parts due to contact between the metal parts coming in contact with the gases have been solved by providing male and female parts fabricated from the same light weight material and seated in a manner that avoids actual contact between the male and female portions.

We have found that aluminum alloys in general give the most satisfactory results for fabricating our coupling for handling liquefied gases as aluminum alloys in general gain in strength at extremely low temperatures, are castable and have satisfactory machining properties in addition to being light weight. Other materials which could be used are brass, stainless steel and copper alloys but each of these substances have serious weight disadvantages, brass being some four times heavier than aluminum and stainless steel three times heavier. Titanium, on the other hand, while light, does not have the other desirable qualities. Two castable aluminum alloys that have proved satisfactory are Almag 35 and Amalloy. However aluminum alloys which are not castable such as 61 Aluminum are less satisfactory for our purpose.

It is also necessary in designing a coupling of the type contemplated for handling low temperature fluids to provide reliable means for disconnecting the lines quickly without having to manipulate the coupling parts, on which ice builds up due to the low temperature of the fluids being handled. This difficulty is overcome by the present invention as a slight tap with a hammer or other instrument on the outer lugs 4 of the union locking element 1 permits rotation of the parts to effect their quick disconnection.

Referring to the drawings which illustrate a preferred embodiment of our invention the assembled coupling 10 is shown in Fig. 9 and consists of three major body portions and the retainer ring 14 illustrated in Fig. 7 and shown in position in Fig. 9. The major body portions are the locking nut 1 illustrated in Figs. 1 and 2, the male conical section 2 illustrated in Figs. 3 and 4 and the female seating portion 3 illustrated in Figs. 5 and 6. The locking nut consists of an annular body provided with wrenching means 4 consisting of a plurality of lugs substantially of rectangular cross section and located equidistantly spaced from one another on the outer surface of the annular body of the nut. The annular or ring portion of the nut is of sufficient width to incorporate on the internal surface an internal thread 5 or other means cooperating with similar means of connection on the external surface of the female seating portion of the coupling for quick attachment or detachment from the seating portion. On the opposite side of the locking nut is provided an internal terminal lip 6 of lesser diameter of the internal threads. This internal lip incorporates a plurality of intermittently spaced slots 7 to cooperate with similarly spaced lugs 8 on the male body 2 (Fig. 3) to permit passage of the cone body through the central opening of the locking nut.

The preferred embodiment of the male conical section 2 comprises on one side a circular cross sectional ring shape 9 of sufficient width to incorporate on the internal surface thereof a threaded or other connecting means for attachment and detachment from the connecting hose or piping of a fluid supply line; and on the external surface of the same side are located the intermittently spaced lugs 8 mentioned above for cooperation with correspondingly spaced slots 7 in the internal lips 6 of the locking nut 1. The opposite end of the male conical section 2 consists of an exterior conical or backwardly tapering surface 11 tapering to a diameter equal to the diameter of the internal terminal lip 6 of the locking nut 1 for a reason which will later become apparent. The lugs 8 on the outer surface of the conical body section 2 extend only partially toward the base of the inner edge of the conical or tapered surface 11 thus providing a grooved portion 12 between these members, the purpose of which will also later become apparent.

The female seating portion 3 of the coupling which is shown in Figs. 5 and 6 consists of a short tubular shape of sufficient width to incorporate on the internal surface of one side thereof a threaded or other connecting means for attachment and detachment from the connecting hose or piping of the line to which the coupling is attached. The cross section of the tubular seating body is also of sufficient width to provide spaced slots 13 or other wrenching means for easy connection and disconnection. The external portion of the opposite side of the female seating body 3 is provided with an external thread 15 or other means of connection to cooperate with corresponding means 5 internally of the locking nut 1. The interior surface of the side having the external threads consists of a partial cone surface tapering inwardly for cooperation with the partial cone surface of the male conical portion 11 in a manner which will be hereinafter more clearly described. A circumferential groove is positioned in the conical portion 16 to receive the low temperature resistant gasket 17 (see Fig. 8) so as to prevent metal to metal bonding of the female portion 3 and the male portion 2 of the coupling. In the preferred embodiment the gasket means 17 consists of a gasket of rectangular cross section made of a material capable of stably resisting the effects of extremely low temperatures. We have found "Teflon" or any of the tetrafluoroethylene resins to be highly satisfactory for this purpose. Eliminating metal to metal contact between the male body 2 and the female seating portion 3 accomplished by employing a gasket which doesn't absorb moisture insures that these separate portions will not freeze together under the extremely low temperature conditions normally encountered when the coupling is in use.

In assembling the coupling the male conical section 2 is inserted lugs first in the interior of the locking or union nut 1 and the lugs 8 passed through the appropriate slots 7 in the terminal lip of the nut 1 and rotated so as to lock the conical body 2 in place. The retaining ring 14 (Fig. 7) is then secured in place between the lugs 8 and the lip 6 of the nut 1.

The female seating element 3 is then externally threaded into the nut 1 until normal contact rotating pressure is no longer exertable at which time the female seating section is in place and the coupling is assembled as shown in Fig. 9, the female seating element 3 and the male conical portion 2 being in contact only through the "Teflon" gasket 17 thus avoiding metal to metal contacts between them in accordance with the invention.

Although a particular embodiment of the invention has been described in detail herein, various changes and modifications will occur to those skilled in the art after a study of the present disclosure. Hence the disclosure is to be taken in an illustrative rather than in a limiting sense, and it is our desire and intention to reserve all modifications falling within the scope of the subjoined claim.

Having now fully disclosed the invention, what I claim and desire to secure by Letters Patent is:

A cryogenic coupling for connecting the ends of a conduit carrying liquid oxygen, said coupling comprising a female seating element of short tubular form having an interior surface tapering inwardly as a partial cone, said interior surface having a circumferential groove therein, a male element having an interior tapering partial conical portion at one end complemental to said interior partial conical portion of said female element, a shoulder adjacent the outer end of said conical portion, said male element having spaced exterior terminal lugs at the other end thereof, a union locking nut having a central opening therethrough and provided with an internal terminal lip having an internal diameter less than the outer diameter of said shoulder and having a plurality of intermittently spaced notches with which said lugs cooperate to permit the passage of said male element through the central opening of said nut, means between said lugs and said terminal lip for retaining said nut on said male member, means on said nut and female element cooperating rotatably and releasably for holding said elements together, and an annular "Teflon" gasket having a corner projecting from said partial cone and positioned in and filling said groove in the female member, said projecting corner adapted to sealingly engage said conical portion of the male member and prevents metal to metal contact between said male and female elements when assembled.

References Cited in the file of this patent

UNITED STATES PATENTS

| | | |
|---|---|---|
| 1,563,836 | Copp | Dec. 1, 1925 |
| 2,196,622 | Bean | Apr. 9, 1940 |
| 2,556,384 | Zeitz | June 12, 1951 |
| 2,661,965 | Parmesan | Dec. 8, 1953 |
| 2,775,471 | Douglass | Dec. 25, 1956 |

FOREIGN PATENTS

| | | |
|---|---|---|
| 5,992 | Great Britain | Apr. 21, 1890 |
| 385,508 | France | Mar. 10, 1908 |